(12) United States Patent
Matsuzawa et al.

(10) Patent No.: US 8,374,620 B2
(45) Date of Patent: Feb. 12, 2013

(54) FREQUENCY ALLOCATION METHOD IN WIRELESS BASE STATION APPARATUS AND WIRELESS BASE STATION APPARATUS

(75) Inventors: Hiromu Matsuzawa, Kawasaki (JP); Keizo Watanabe, Kawasaki (JP); Satoshi Makino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 571 days.

(21) Appl. No.: 12/473,325

(22) Filed: May 28, 2009

(65) Prior Publication Data
US 2010/0027489 A1 Feb. 4, 2010

(30) Foreign Application Priority Data
Aug. 4, 2008 (JP) .................................. 2008-200909

(51) Int. Cl.
*H04W 72/00* (2009.01)
(52) U.S. Cl. .................. 455/452.1; 455/522; 455/422.1; 455/443; 370/328; 370/329; 370/338
(58) Field of Classification Search .......................... None
See application file for complete search history.

(56) References Cited

U.S. PATENT DOCUMENTS

| | | | | |
|---|---|---|---|---|
| 5,881,094 | A * | 3/1999 | Schilling | 375/133 |
| 5,982,337 | A * | 11/1999 | Newman et al. | 343/816 |
| 6,799,045 | B1 * | 9/2004 | Brouwer | 455/453 |
| 6,999,760 | B2 * | 2/2006 | Dhainaut | 455/422.1 |
| 2001/0046866 | A1 | 11/2001 | Wang | |
| 2004/0097238 | A1 | 5/2004 | Hwang et al. | |
| 2005/0025093 | A1 * | 2/2005 | Yun et al. | 370/328 |
| 2008/0037672 | A1 | 2/2008 | Yun et al. | |
| 2008/0081633 | A1 * | 4/2008 | Oteri et al. | 455/452.1 |
| 2009/0082054 | A1 * | 3/2009 | Li et al. | 455/522 |

FOREIGN PATENT DOCUMENTS

| | | |
|---|---|---|
| EP | 1 503 610 | 2/2005 |
| JP | 09-261726 | 10/1997 |
| JP | 2004-159345 | 6/2004 |
| WO | 2008/041281 | 4/2008 |
| WO | 2008/057791 | 5/2008 |

OTHER PUBLICATIONS

Extended European Search Report with Communication that includes Abstract and Title for corresponding European Patent Application No. 09162262.1, dated Dec. 23, 2009.
Notification of Reason for Rejection issued for corresponding Japanese Patent Application No. 2008-200909 dispatched Aug. 7, 2012 with English translation.

* cited by examiner

*Primary Examiner* — Ian N Moore
*Assistant Examiner* — Brian T Le
(74) *Attorney, Agent, or Firm* — Myers Wolin, LLC

(57) ABSTRACT

A frequency allocation method in a base station communicating wirelessly with a terminal, for dividing a cell into six areas in a clockwise direction, and allocating a frequency to each of the divided sectors, including: dividing the cell into an outer circle and an inner circle; allocating to a first terminal positioned in the outer circle of the sector, a frequency different from a frequency allocated to a second terminal positioned in an adjacent sector of the same cell, and the frequency different from a frequency allocated to a third terminal positioned in the outer circle of an adjacent sector of the adjacent cell; and allocating the frequency allocated to the first terminal to fourth and fifth terminal positioned in the inner circle of two sectors respectively arranged two sectors away from the sector in which the first terminal is positioned.

7 Claims, 14 Drawing Sheets

FIG. 8

| BASE STATION C SECTOR 1 | DOWNLINK COMMON CHANNEL SIGNAL-INTERFERENCE RATIO (dB) |
|---|---|
| OUTER CIRCLE | X < 10.9 |
| INNER CIRCLE | x ≧ 10.9 |

FIG. 9

| BASE STATION | SECTOR | AREA | FREQUENCY GROUP |
|---|---|---|---|
| BASE STATION C | SECTOR 1 | OUTER CIRCLE | f2 |
| | | INNER CIRCLE | f2<br>f4<br>f6 |
| | SECTOR 2 | OUTER CIRCLE | f3 |
| | | INNER CIRCLE | f3<br>f1<br>f5 |
| | SECTOR 3 | OUTER CIRCLE | f4 |
| | | INNER CIRCLE | f4<br>f2<br>f6 |
| | SECTOR 4 | OUTER CIRCLE | f5 |
| | | INNER CIRCLE | f5<br>f3<br>f1 |
| | SECTOR 5 | OUTER CIRCLE | f6 |
| | | INNER CIRCLE | f6<br>f4<br>f2 |
| | SECTOR 6 | OUTER CIRCLE | f1 |
| | | INNER CIRCLE | f1<br>f5<br>f3 |

| BASE STATION C SECTOR 1 | BASE STATION MAXIMUM TRANSMISSION POWER SETTINGS (dBm) | MOBILE STATION MAXIMUM TRANSMISSION POWER SETTINGS (dBm) |
|---|---|---|
| OUTER CIRCLE | 25 | 20 |
| INNNER CIRCLE | 19.4 | 14.4 |

FREQUENCY ALLOCATION METHOD IN WIRELESS BASE STATION APPARATUS AND WIRELESS BASE STATION APPARATUS

CROSS-REFERENCE TO RELATED APPLICATIONS

This application is based upon and claims the benefit of priority of the prior Japanese Patent Application No. 2008-200909, filed on Aug. 4, 2008, the entire contents of which are incorporated herein by reference.

FIELD

The embodiment(s) discussed herein is (are) related to a frequency allocation method in a wireless base station apparatus, and to a wireless base station apparatus.

BACKGROUND

In the prior art, communication methods such as FDMA (Frequency Division Multiple Access) and OFDMA (Orthogonal Frequency Division Multiple Access) have employed a method of dividing the frequencies allocated to the entire system and allocating different frequencies to adjacent cells, in order to avoid interference between adjacent cells (see for example Japanese Laid-open Patent Publication No. 2004-159345).

FIG. 13 is used to explain the frequency allocation method. As depicted in the figure, in the method, for example three cells (cells #A to #C) are allocated different frequencies (f1 to f3). Near cell boundaries, two terminal apparatuses positioned in different cells use different frequencies, so that there are no problems with interference, and good-quality communication with a base station apparatuses is possible.

FIG. 14 and FIG. 15A to FIG. 15C depict an example of another method of frequency allocation described in the above Japanese Laid-open Patent Publication No. 2004-159345. As depicted in FIG. 13 and similar, a common frequency (f4) is allocated in regions near the base station in each cell, and in regions near boundaries with adjacent cells, frequencies which are different from those of adjacent cells (f1 to f3) are allocated.

In the frequency allocation method in which different frequencies are allocated to adjacent cells (FIG. 13), the frequency utilization efficiency in each cell is "⅓" of the overall frequency band. On the other hand, in the frequency allocation method in which different frequencies are allocated to adjacent cells while using the common frequency (FIG. 14 and elsewhere), the frequency utilization efficiency is "2/4=½". The frequency efficiency of frequency allocation using the common frequency is better than that of frequency allocation not using the common frequency.

On the other hand, cell configuration methods include an "omni cell" and "sector cell" methods. The "omni cell" is a cell using a non directional antenna in the base station apparatus. A "sector cell" is a cell using a directional antenna. FIG. 16 and FIG. 17 depict examples of "omni cell" and "three-sector cell" configurations respectively. In both cases, three frequencies, "f1" to "f3", are used, and different frequencies are allocated between adjacent cells and adjacent sectors.

Focusing on the cell and sector to which the frequency "f1" is allocated, in the "omni cell" (FIG. 16), radio waves arrive from each of the base station apparatuses 100 of the six adjacent cells, so that there is a high possibility of interference. On the other hand in the "three sector cell" (FIG. 17), the directional antenna is used, so that radio wave is not received from base station apparatus in the diagonal upper-left direction, and to this extent there is less interference compared with the "omni cell" case.

FIG. 18 depicts an example of a "six-sector cell". In the "six-sector cell", different frequencies are allocated to adjacent sectors, and the frequency utilization efficiency in each sector is "⅙".

As explained above, an occurrence of interference of the "sector cell" is less than of the "omni cell". The method of frequency allocation which utilizes the common frequency (FIG. 14) is a method using the "omni cell". By applying the frequency allocation method to the "sector cell", the occurrence of interference can be reduced.

However, the frequency utilization efficiency of the "sector cell" has lower than the "omni cell". For example, the frequency allocation utilization efficiency of the "omnicell" depicted in FIG. 14 is "½", but the frequency allocation utilization efficiency of the "six-sector cell" system depicted in FIG. 18 is "⅙".

SUMMARY

According to an aspect of the invention, a frequency allocation method, in a wireless base station apparatus communicating wirelessly with a terminal apparatus, for dividing a cell that is a communication range of the wireless base station apparatus into six areas in a clockwise direction, and allocating a frequency to each of the divided sectors, the method including: dividing the cell into an outer circle and an inner circle, wherein the outer circle is a range of the cell, and the inner circle is a range at a shorter distance from the wireless base station apparatus than the outer circle; allocating to a first terminal apparatus positioned in the outer circle of the sector, a frequency different from a frequency allocated to a second terminal apparatus positioned in an adjacent sector of the same cell, and the frequency different from a frequency allocated to a third terminal apparatus positioned in the outer circle of an adjacent sector of the adjacent cell; and allocating the frequency allocated to the first terminal apparatus to fourth and fifth terminal apparatus positioned in the inner circle of two sectors respectively arranged two sectors away from the sector in which the first terminal apparatus is positioned.

According to an aspect of the invention, a frequency allocation method in a wireless base station apparatus for dividing a cell that is a communication range of the wireless base station apparatus communicating wirelessly with a terminal apparatus into six areas in a clockwise direction, and allocating a frequency to each of the six divided sectors, the method including: receiving measurement result of communication quality with the wireless base station apparatus from the terminal apparatus, and determining position information indicating whether the terminal apparatus is positioned in an outer circle which is a range of the cell, or in an inner circle which is a range at a shorter distance from the wireless base station apparatus than the outer circle on the basis of the measurement result in a first table; selecting the frequency to be allocated to the terminal apparatus on the basis of the position information in a second table; selecting a transmission power value for the terminal apparatus on the basis of the position information in a third table; and transmitting and receiving data with the terminal apparatus at the selected frequency and transmission power value.

The object and advantages of the invention will be realized and attained by means of the elements and combinations particularly pointed out in the claims.

BRIEF DESCRIPTION OF DRAWING(S)

FIG. 8 depicts an example of an inner/outer circle judgment reference table;

FIG. 9 depicts an example of a frequency arrangement judgment reference table;

DESCRIPTION OF EMBODIMENT(S)

Preferred embodiments of the present invention will be explained with reference to accompanying drawings.

Figure 1:
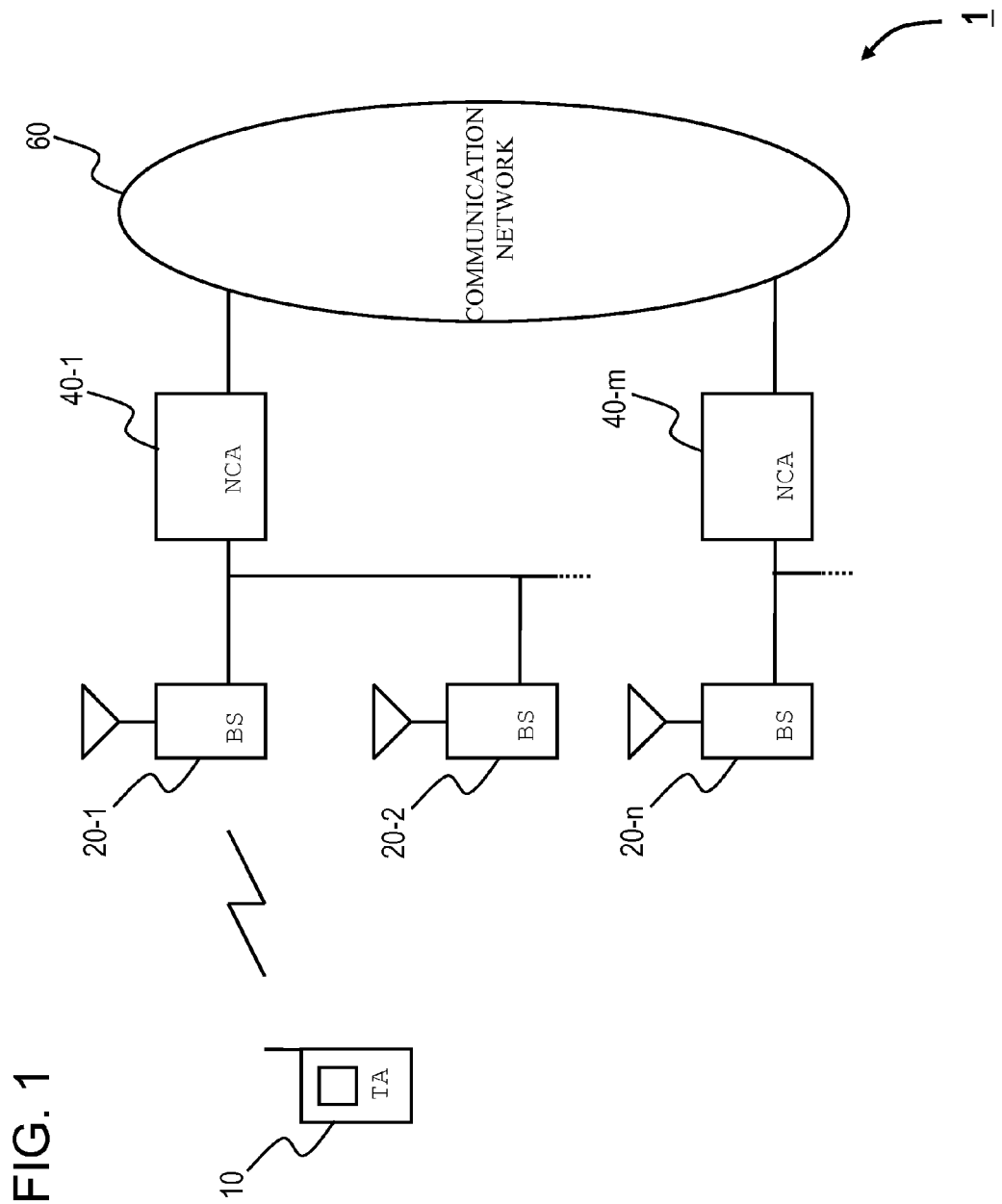
FIG. 1 depicts an example of the configuration of a communication system.

FIG. 1 depicts an example of the configuration of a mobile communication system 1. The mobile communication system 1 includes a terminal apparatus 10, wireless base station apparatuses (hereafter "base station apparatuses") 20-1 to 20-n, network connection apparatuses 40-1 to 40-m, and a communication network 60.

The terminal apparatus 10 is for example a portable telephone, PDA (Personal Digital Assistants), or other portable information terminal.

The base station apparatuses 20-1 to 20-n are connected between the terminal apparatus 10 and the network connection apparatuses 40-1 to 40-m, and perform conversion, relaying, line management, communication control, and other processing between wireless lines and wire lines. Details are given below.

The network connection apparatuses 40-1 to 40-m are interfaces between the communication network 60 and the base station apparatuses 20-1 to 20-n, and manage the states of the wire lines and terminal apparatus 10 and similar.

In the mobile communication system 1, the terminal apparatus 10 communicates wirelessly with the base station apparatuses 20-1 to 20-n which form the cells which are the ranges over which communication with the base station apparatuses 20-1 to 20-n is possible, while the terminal apparatus 10 moves through the cells. In the embodiment, each cell includes a configuration of a "sector cell", and the base station apparatuses 20-1 to 20-n include directional antennas.

Figure 2:
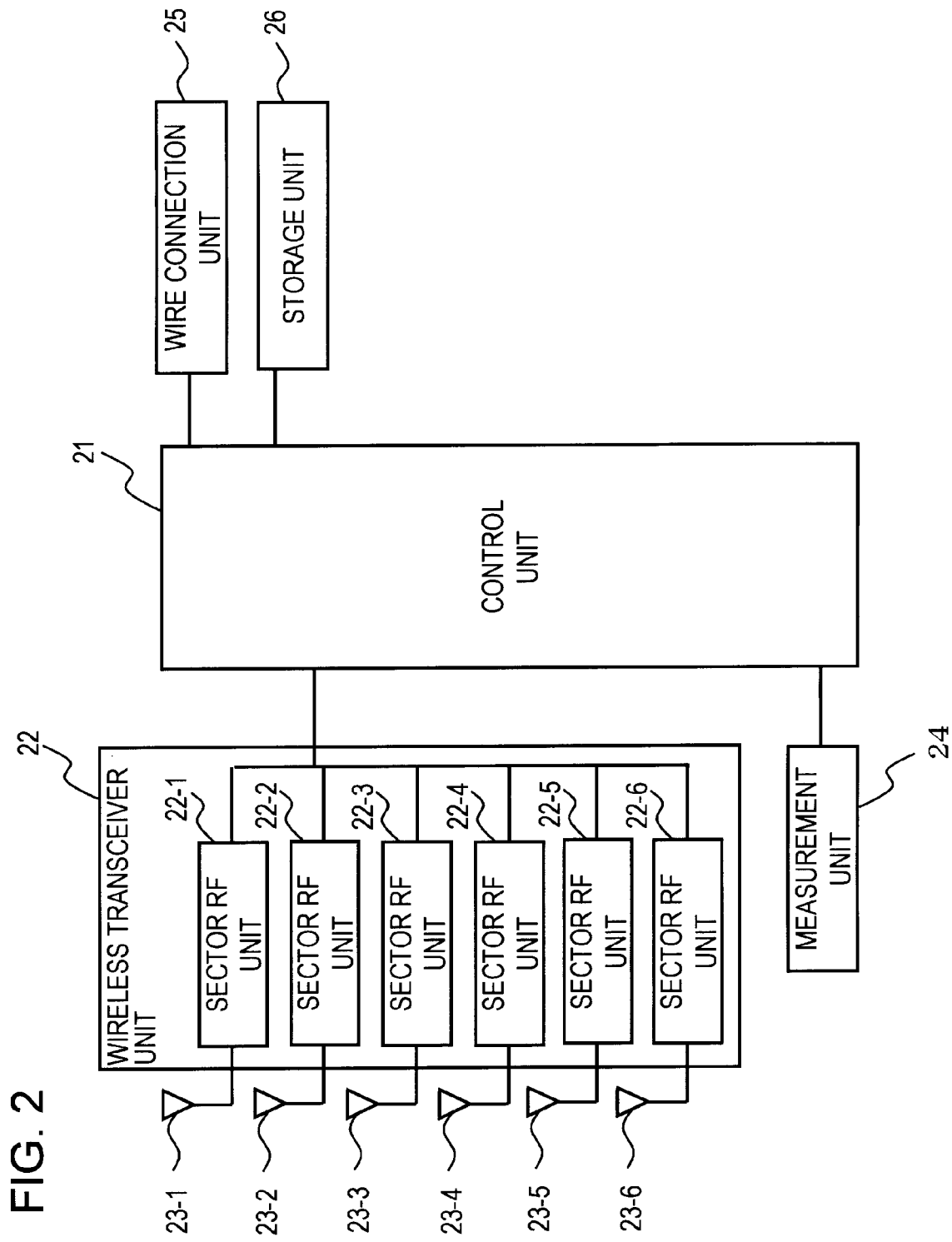
FIG. 2 depicts an example of the configuration of a wireless base station apparatus.

FIG. 2 depicts an example of the configuration of the base station apparatuses 20-1 to 20-n (hereafter, a "base station apparatus 20").

The base station apparatus 20 includes a control unit 21, wireless transceiver unit 22, first to sixth antennas 23-1 to 23-6, measurement unit 24, wire connection unit 25, and storage unit 26.

The control unit 21 is connected to the wireless transceiver unit 22, measurement unit 24, wire connection unit 25, and storage unit 26, and performs various control. The control unit 21 is described in detail below.

The wireless transceiver unit 22 performs conversion between wireless signal and wire signal and similar, and sends transmission signal or receives reception signal by wireless communication. The wireless transceiver unit 22 further includes first to sixth sector RF units 22-1 to 22-6. The first to sixth sector RF units 22-1 to 22-6 are respectively connected to the first to sixth antennas 23-1 to 23-6, and output wireless signals of frequencies allocated in advance to the antennas 23-1 to 23-6 at prescribed transmission levels, under the control of the control unit 21. The first to sixth sector RF units 22-1 to 22-6 output wireless signals received by the antennas 23-1 to 23-6 from the terminal apparatus 10 to the control unit 21 and measurement unit 24.

The first to sixth antennas 23-1 to 23-6 wirelessly transmit transmission signals from the first to sixth sector RF units 22-1 to 22-6 to the terminal apparatus 10, and receive wireless signals transmitted from the terminal apparatus 10 and output the signals to the first to sixth sector RF units 22-1 to 22-6. The first to sixth antennas 23-1 to 23-6 are antennas having so-called directionality, are each directed in a different direction, and transmit and receive wireless signals in the respective directions. Because the first to sixth antennas 23-1 to 23-6 are used, each such cell is called a "six-sector cell" including six sectors.

The measurement unit 24 generates a common pilot signal or similar, outputs to the wireless transceiver unit 22 or similar, and measures the position of the subordinate terminal apparatus 10 by receiving the measurement result from the terminal apparatus 10.

The wire connection unit 25 is connected with the network connection apparatuses 40-1 to 40-m, and outputs to the network connection apparatuses 40-1 to 40-m signals from the wireless transceiver unit 22 via the control unit 21, and outputs to the control unit 21 signals from the network connection apparatuses 40-1 to 40-m.

The storage unit 26 stores various tables, including an inner outer circle judgment reference table, frequency arrangement reference table, maximum transmission power reference table, priority frequency selection reference table, and other tables.

Figure 3:
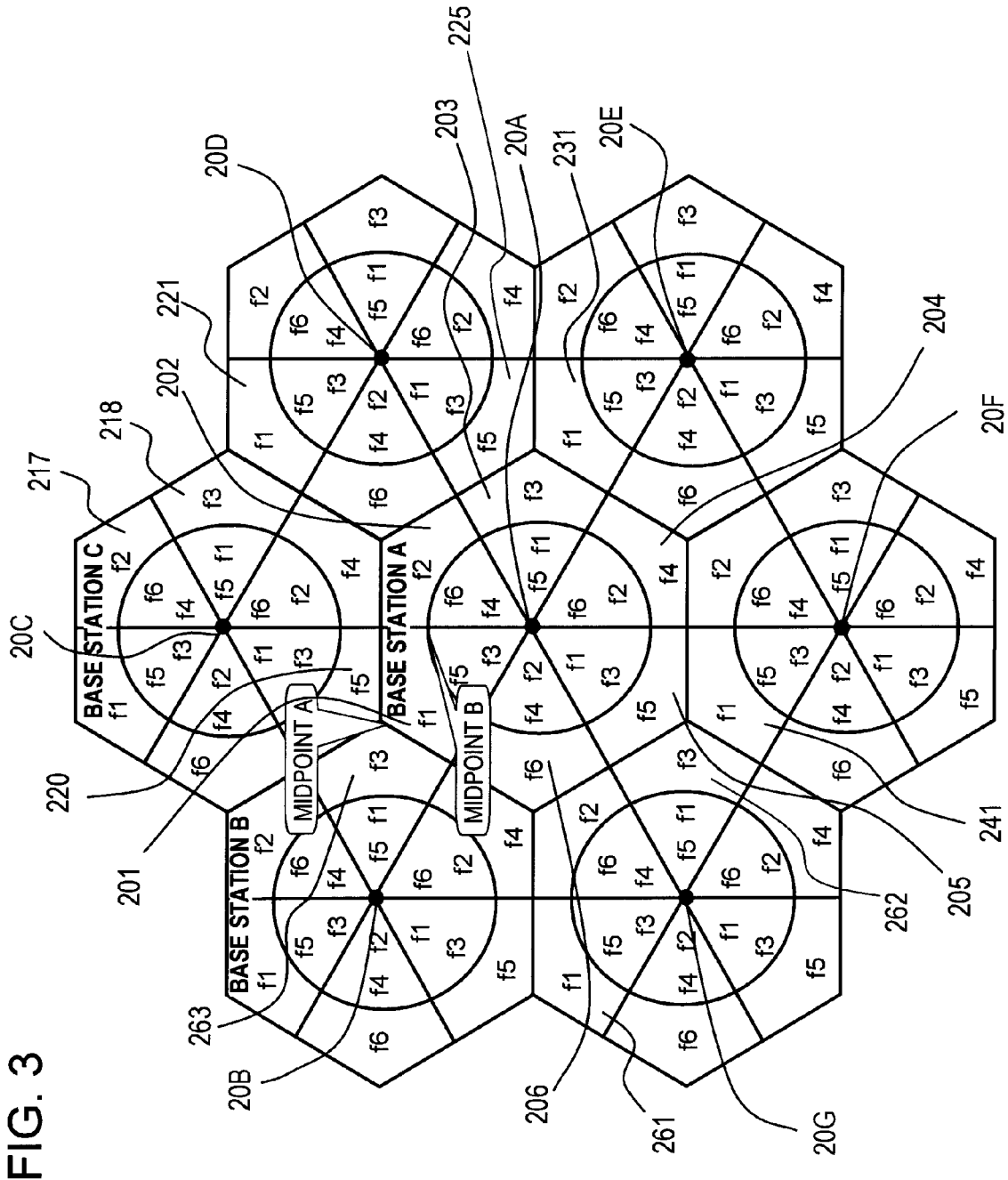
FIG. 3 depicts an example of frequency arrangement.

Next, an example of frequency arrangement in the embodiment is explained. FIG. 3 depicts an example of frequency arrangement. One hexagon represents the cell range for one base station apparatus 20. Each cell has a so-called "six sector" configuration, and is divided into six sectors. Further, each cell is divided into areas of inner and outer circles, and different frequencies are arranged in sectors in the inner circles and outer circles. In the frequency arrangement depicted in FIG. 3, the frequencies arranged in the outer circle in each sector are different from the frequencies in the adjacent sectors of adjacent cells. Focusing on the cell of the base station apparatus 20A, frequencies "f1" to "f6" are arranged in order in the outer circle in the sectors 201 to 206 respectively. And, in the same cell, frequencies used in the outer circle are arranged within the circle in two sectors rotated 120° (in the two sectors which are two sectors away from the sector). Focusing on the cell of the base station apparatus 20A, the frequency "f1" allocated in the outer circle in sector 201 is arranged in the inner circle in the two sectors 203 and 205, shifted 120° in both directions in the same cell. When frequencies are similarly arranged in order in the inner circle, the frequency arrangement depicted in FIG. 3 results. When the terminal apparatus 10 is positioned in the inner circle and in the outer circle in each sector, frequencies are allocated as depicted in FIG. 3.

In the frequency arrangement of the embodiment, the frequency used in the outer circle can also be used in the inner circle. For example, in sector 201 of the base station apparatus 20A, the frequency "f1" used in the outer circle can also be used in the inner circle.

Figure 4A:
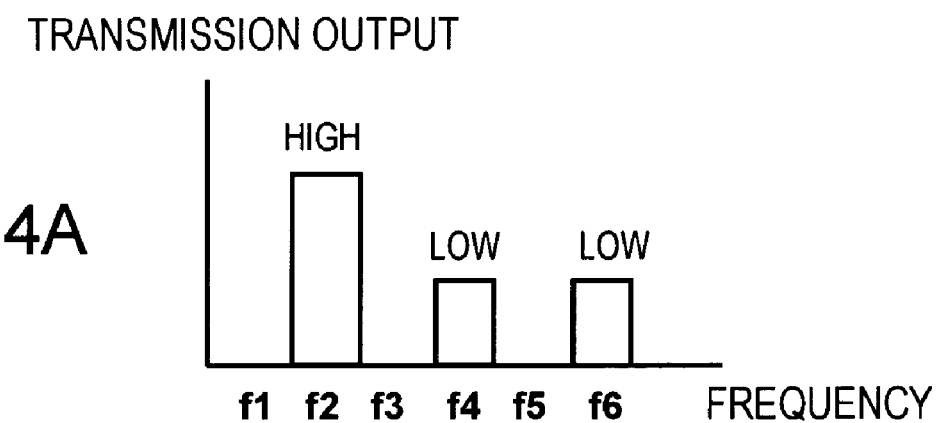
FIG. 4A and FIG. 4B depict examples of transmission power values.
Figure 4B:
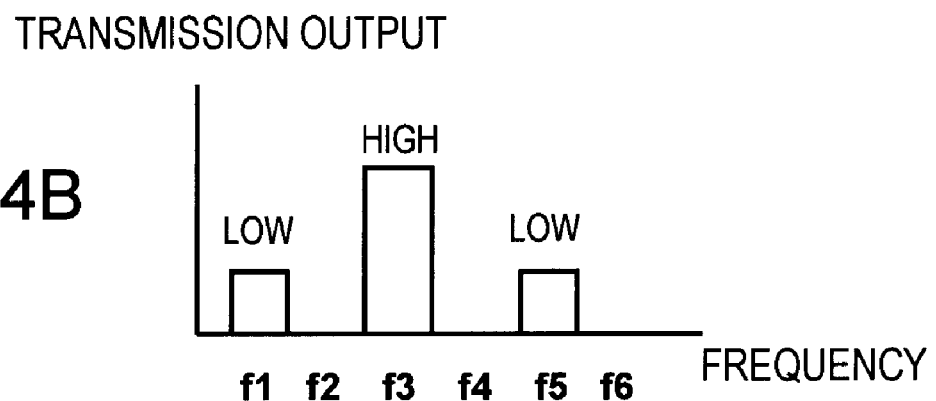

FIG. 4A depicts the frequencies arranged in sector 217 of the base station apparatus 20C, and levels thereof; FIG. 4B depicts an example of frequencies arranged in sector 218 and levels thereof. As depicted in FIG. 4A, the antenna 23-2 transmitting radio waves to sector 217 wirelessly transmits signals with the output level of the frequency "f2" at high level, and with the output level of the frequencies "f4" and "f6" at low level. On the other hand, the antenna 23-3 transmitting radio waves to sector 218 transmits at frequencies "f1", "f3" and "f5", and the transmission levels are respectively "low", "high", and "low". By making a transmission level "high", radio waves can be transmitted in the outer circle in the sector.

Next, communication quality for the frequency arrangement depicted in FIG. 3 is explained. The midpoints A and B depicted in FIG. 3 are used as evaluation points, and communication quality at these points is explained.

Figure 5:
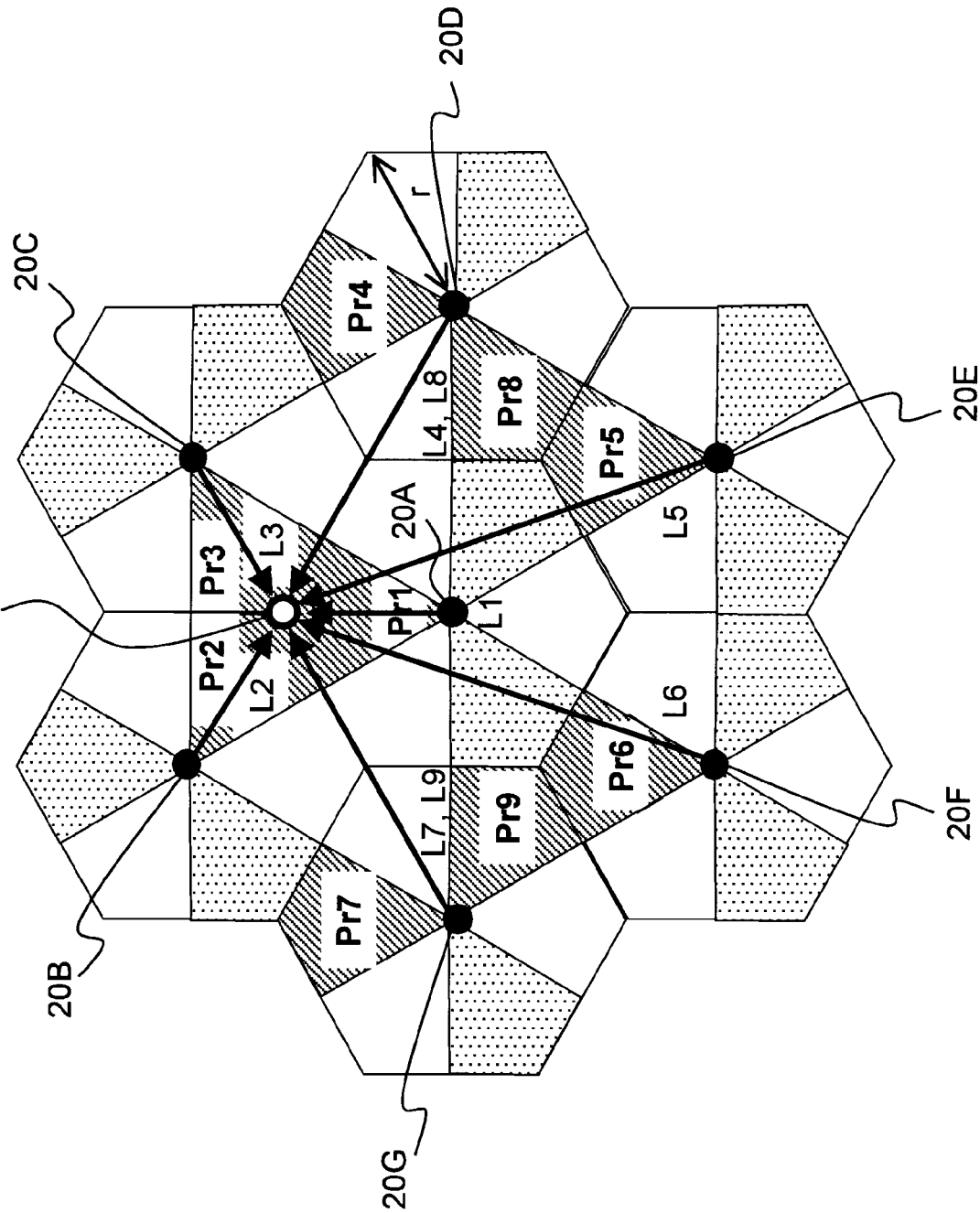
FIG. 5 is used to explain communication quality at the midpoint A.

First, communication quality at midpoint A is explained. FIG. 5 is used to explain communication quality at midpoint A; to make the explanation easy to understand, FIG. 5 is rotated 30° to the right relative to FIG. 3.

Here, focusing on the frequency f1, the midpoint A is the point equidistant from three base station apparatuses 20A, 20B, 20C, and radio waves from the antenna 23-1 of the base station apparatus 20A corresponding to sector 201 are desired waves, whereas radio waves from each of the antennas 23-1 to 23-6, corresponding to the sector 263 of base station apparatus 20B, the sector 220 of base station apparatus 20C, the sectors 221 and 225 of base station apparatus 20D, the sector 231 of base station apparatus 20E, the sector 241 of base station apparatus 20F, and the sectors 261 and 262 of base station apparatus 20G, are interference waves.

Thus the midpoint A is positioned on the cell edge of base station 20A (or on the outside thereof), and is at the position with the harshest conditions for receiving interference waves from adjacent base station 20B and elsewhere. Hence by calculating the communication quality of midpoint A, it is possible to judge whether the frequency allocation depicted in FIG. 3 satisfies certain quality criteria.

Here, considering the directionality of the antennas in each sector, interference from sectors the antenna direction of which is 90° or more at variance from the direction to the midpoint A is ignored (sectors indicated by dotted-line shading in FIG. 5). For example, sector 203 of base station 20A and sector 218 of base station 20C also use frequency f1, but the directions of these antennas are directed away from the midpoint A, and the so-called front-back ratio is approximately 25 dB (there is attenuation of approximately 25 dB=1/300 relative to the gain in the antenna direction), and so such interference can be ignored. Similarly hereafter, when the antenna direction is at variance by 90° or more from the observation point (midpoint A, midpoint B, and so on), this interference can be ignored in interference calculations.

The powers received at midpoint A from each of the base station apparatuses 20A to 20G (the antennas 23-1 to 23-6 corresponding to each of the sectors 201 and similar) at frequency f1 (not including power received from sectors that can be ignored, as explained above), that is, the powers received from the sectors 201, 263, 220, 221, 231, 241, 261, 225, 262, are Pr1 to Pr9 (dBm), the transmitted powers from the base station apparatuses 20A to 20G in each of the above sectors are Pt1 to Pt9 (dBm), and the power propagation losses from the base station apparatuses 20A to 20G to the midpoint A are L1 to L9 (dB). The signal-interference ratio SIR for frequency f1 at midpoint A is given by $$[SIR]=[Pr1]/([Pr2]+[Pr3]+[Pr4]+[Pr5]+[Pr6]+[Pr7]+[Pr8]+[Pr9]] \quad (1)$$

Here bracket [ ] denotes true values in dB. Modifying equation (1) gives:

$$[SIR]=[(Pt1-L1)]/\{[(Pt2-L2)]+[(Pt3-L3)]+[(Pt4-L4)]+[(Pt5-L5)]+[(Pt6-L6)]+[(Pt7-L7)]+[(Pt8-L8)]+[(Pt9-L9)]\} \quad (2)$$

Here, the midpoint A is equidistant from the base station apparatuses 20A, 20B and 20C, so that the propagation losses from the antennas 23-1 to 23-6 for each of the base station apparatuses 20A, 20B, 20C are the same, and so L1=L2=L3.

Further, if the distance from the base station apparatus 20A to the midpoint A is r, the distance from the base station apparatuses 20E and 20F to the midpoint A is 2.65 r. In general, the amount of attenuation of transmitted power is proportional to the 3.5 power of the distance (attenuation factor 3.5 power law), and so the following equation obtains.

Ratio of attenuation amount at distance r to attenuation amount at distance $R=(R/r)^{3.5}$ (3)

Expressing this equation (3) in decibels gives:

Attenuation amount ratio=35 log(R/r) (dB) (31)

Hence, the ratio of the transmitted ratio wave attenuation amount from the antennas 23-1 corresponding to the directions of sector 231 of base station apparatus 20E and sector 241 of base station apparatus 20F to the attenuation amount at distance r is 35 log(2.65)≈14.8 (dB), and the following equation obtains.

$$L5=L6=L1+14.8 \quad (4)$$

Further, because the distance from the base station apparatuses 20D, 20G to the midpoint A can be set to 2r, the ratio of the attenuation amount from the antennas 23-1 to 23-6 corresponding to the directions of sectors 221 and 225 of base station apparatus 20D and sectors 261 and 262 of base station apparatus 20G to the midpoint A, to the attenuation amount at distance r, is 35 log(2)≈10.5 (dB). However, in this case, the direction of each of the antennas 23-1 to 23-6 is inclined by 60° with respect to midpoint A, so that there is normally attenuation of approximately 13 (dB) on the basis of the properties of the antennas 23-1 to 23-6. Hence the following obtains.

$$L4=L7=L8=L9=L1+10.5+13=L1+23.5 \quad (5)$$

Further, the antennas 23-1 corresponding to the sector 201 of base station apparatus 20A, sector 221 of base station apparatus 20D, sector 231 of base station apparatus 20E, sector 241 of base station apparatus 20F, and sector 261 of base station apparatus 20G transmit radio waves to the outer circles at frequency "f1".

On the other hand, the antennas 23-1 to 23-6 corresponding to the sector 263 of base station apparatus 20B, sector 220 of base station apparatus 20C, sector 225 of base station apparatus 20D, and sector 262 of base station apparatus 20G transmit radio waves to the inner circles at frequency "f1".

Here, if the ratio of transmission powers in the inner and outer circles is S, then the following obtain.

$$Pt1=Pt4=Pt5=Pt6=Pt7 \qquad (6)$$

$$Pt2=Pt3=Pt8=Pt9=Pt1+S \qquad (7)$$

Substituting all of equations (4) to (7) into equation (2) gives:

$$[SIR]=[(Pt1-L1)]/\{[(Pt1+S)-L1]+[(Pt1+S)-L1]+ \\ [Pt1-(L1+23.5)]+[Pt1-(L1+14.8)]+[Pt1-(L1+ \\ 14.8)]+[Pt1-(L1+23.5)]+[(Pt1+S)-(L1+23.5)]+ \\ [(Pt1+S)-(L1+23.5)]\} \qquad (8)$$

Proceeding with calculations while noting that the bracket [ ] denotes true value in dB, on the right-hand side of equation (8), the [Pt1−L1] is canceled in the numerator and denominator. And, by substituting SIR=2 (dB) into equation (8), S −5.6 (dB) is obtained.

That is, with respect to the communication quality at midpoint A, by setting the transmission power in the inner circles approximately "5.6 dB" lower than the transmission power in the outer circles for each of the base station apparatuses 20A to 20G, a certain quality at midpoint A (for example, SIR=2 dB) can be satisfied.

Next, communication quality at the midpoint B is explained. The interference should be calculated at frequency f1, for example at the midpoint in the inner circle of sector 263 of base station apparatus 20B, correspondingly to the interference calculations at frequency f1 in the outer circles at midpoint A. However, the point for which interference is calculated is a midpoint in the inner circle in sector 201 of base station apparatus 20A, and the frequency considered is frequency f5, in order to make the relationship between sector and antenna direction more easy to understand. The results of calculations for frequency f5 are equal to calculations for f1 in sector 263.

Figure 6:
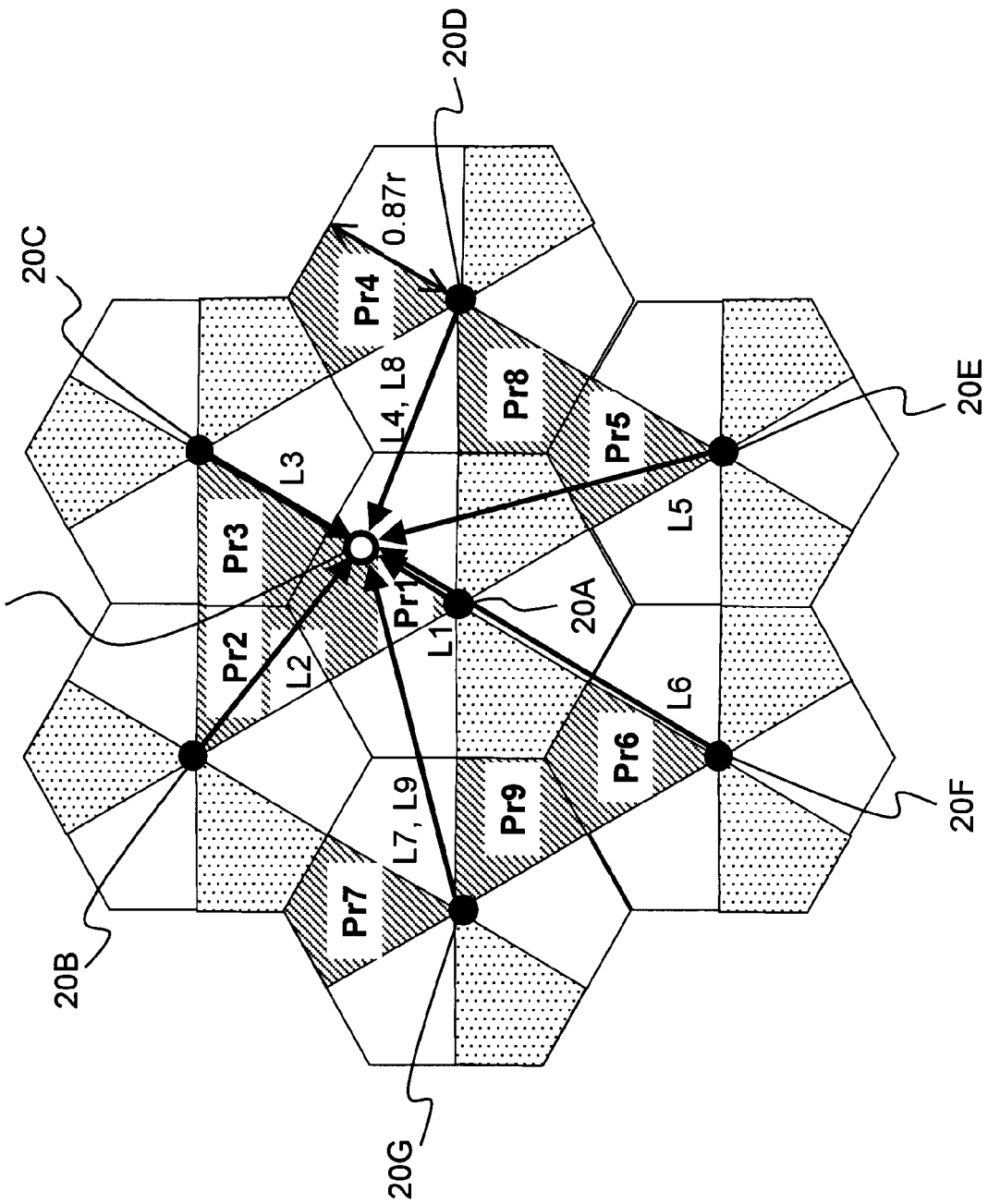
FIG. 6 is used to explain communication quality at the midpoint B.

FIG. 6 is a figure used to explain communication quality at midpoint B, and is rotated 30° to the right relative to FIG. 3 in order to make the explanation easier to understand.

In this case, radio wave from the antenna 23-1 of the base station apparatus 20A corresponding to the direction of sector 201 are desired wave, whereas radio waves from each of the antennas 23-1 to 23-6, corresponding to the sector 263 of base station apparatus 20B, the sector 220 of base station apparatus 20C, the sectors 221 and 225 of base station apparatus 20D, the sector 231 of base station apparatus 20E, the sector 241 of base station apparatus 20F, and the sectors 261 and 262 of base station apparatus 20G, are interference waves. In addition to the above sectors, there also exist other sectors which use the frequency f5, but due to the antenna direction and the antenna directionality, these interference powers can be ignored.

The midpoint B is a point to judge whether a certain quality is satisfied at the inner and outer circle boundary, because the desired waves can be received at the midpoint B from the base station apparatus 20A within the sector, and radio wave with the high transmission power is interference transmitted from the adjacent base station apparatus 20C to the outer circle in sector 220 (at frequency f5) if sector is divided into the areas of inner circle and outer circle.

The signal-interference ratio SIR for frequency f5 at midpoint B is $$[SIR]=[Pr1]/([Pr2]+[Pr3]+[Pr4]+[Pr5]+[Pr6]+[Pr7]+ \\ [Pr8]+[Pr9]) \qquad (9)$$

If the distance from the base station apparatus 20A to the midpoint B is 0.87 rx (where r is the outer circle radius and x is the ratio of the radius of the inner circle to the radius of the outer circle when the quality within the inner circle is at a given level relative to the level at the outer circle radius r), the distance from the base station apparatus 20B and from the base station apparatus 20D to the midpoint B is $0.87(x^2-2x+4)^{-0.5}$, so that the ratio of the attenuation from the base station apparatus 20A to the midpoint B to the attenuation from the base station apparatuses 20B and 20D to the midpoint B is 35 log $\{(x^2-2x+4)^{-0.5}/x\}$=La (dB). Because the antenna direction in base station apparatus 20D for sector 221 is inclined 60° or more with respect to the midpoint B, there is normally attenuation of approximately 13 dB on the basis of the antenna properties. Hence, $$L2=L8=L1+La \qquad (101)$$

$$L4=L1+L1+13 \qquad (102)$$

The ratio of the attenuation from the base station apparatus 20A to the midpoint B to the attenuation from the base station apparatus 20C to the midpoint B is 35 log $\{(2-x)/x\}$=Lb (dB), and so the following obtains.

$$L3=L1+Lb \qquad (103)$$

The ratio of the attenuation from the base station apparatus 20A to the midpoint B to the attenuation from the base station apparatus 20E and the base station apparatus 20G to the midpoint B is 35 log $\{(x^2+2x+4)^{-0.5}/x\}$=Lc (dB). Because the antenna direction in the base station apparatus 20G of sector 261 is inclined 60° or more with respect to the midpoint B, there is normally attenuation of approximately 13 dB on the basis of the antenna properties. Hence, $$L5=L9=L1+Lc \qquad (104)$$

$$L7=L1+Lc+13 \qquad (105)$$

The ratio of the attenuation from the base station apparatus 20A to the midpoint B to the attenuation from the base station apparatus 20F to the midpoint B is 35 log $\{(3-x)/x\}$=Ld (dB), and so the following obtains.

$$L6=L1+Ld \qquad (106)$$

The antennas 23-1 to 23-6 corresponding to the directions of sector 201 of base station apparatus 20A, sector 263 of base station apparatus 20B, sector 221 of base station apparatus 20D, sector 231 of base station apparatus 20E, sector 241 of base station apparatus 20F, and sectors 261 and 262 of base station apparatus 20G, transmit radio waves within the inner circles at frequency "f5".

On the other hand, the antennas 23-5 corresponding to the directions of sector 220 of base station apparatus 20C and sector 225 of base station apparatus 20D transmit radio waves to the outer circles at frequency "f5". When the transmission power ratio S to the inner and outer circles is "−5.6 dB", the following obtain.

$$Pt1=Pt2=Pt4=Pt5=Pt6=Pt7 \qquad (107)$$

$$Pt3=Pt8=Pt1-S=Pt1+5.6 \qquad (108)$$

Here, substituting equations (101) to (108) into equation (9) gives:

$$[SIR] = [0]/\{[-La] + [-S - Lb] + [-La - 13] + [-Lc] + \quad (11)$$
$$[-Ld] + [-Lc - 13] + [-S - La] + [-Lc]\}$$
$$= [0]/\{[-La] + [5.6 - Lb] + [-La - 13] + [-Lc] +$$
$$[-Ld] + [-Lc - 13] + [5.6 - La] + [-Lc]\}$$

In the equation (11), upon determining the value of x for which SIR=2 dB, x=0.70 is obtained (if the outer circle radius for the base station apparatus 20A is 1, the radius of the inner circle is 0.7), and Lb=35 log {(2−0.70)/0.70}=9.4 dB is obtained.

That is, if the ratio of propagation losses between base station apparatus 20A and midpoint B, and between base station apparatus 20B and midpoint B is 9.4 dB, then the communication quality (2 dB) can be satisfied at midpoint B (in the inner circle in the sector 263 of base station apparatus 20B). Here, the propagation loss, that is, the attenuation amount conforms to equation (3), so that if the attenuation amount is 9.4 dB, the distance ratio R≠1.9.

That is, with respect to the communication quality at midpoint B, if the transmission power ratio between the inner circle and outer circle is approximately 5.6 dB, and the ratio of distances between the base station apparatus 20A and midpoint B and between the base station apparatus 20B and midpoint B is approximately 1.9, then the certain quality (for example, SIR=2 dB) can be satisfied.

Figure 7:
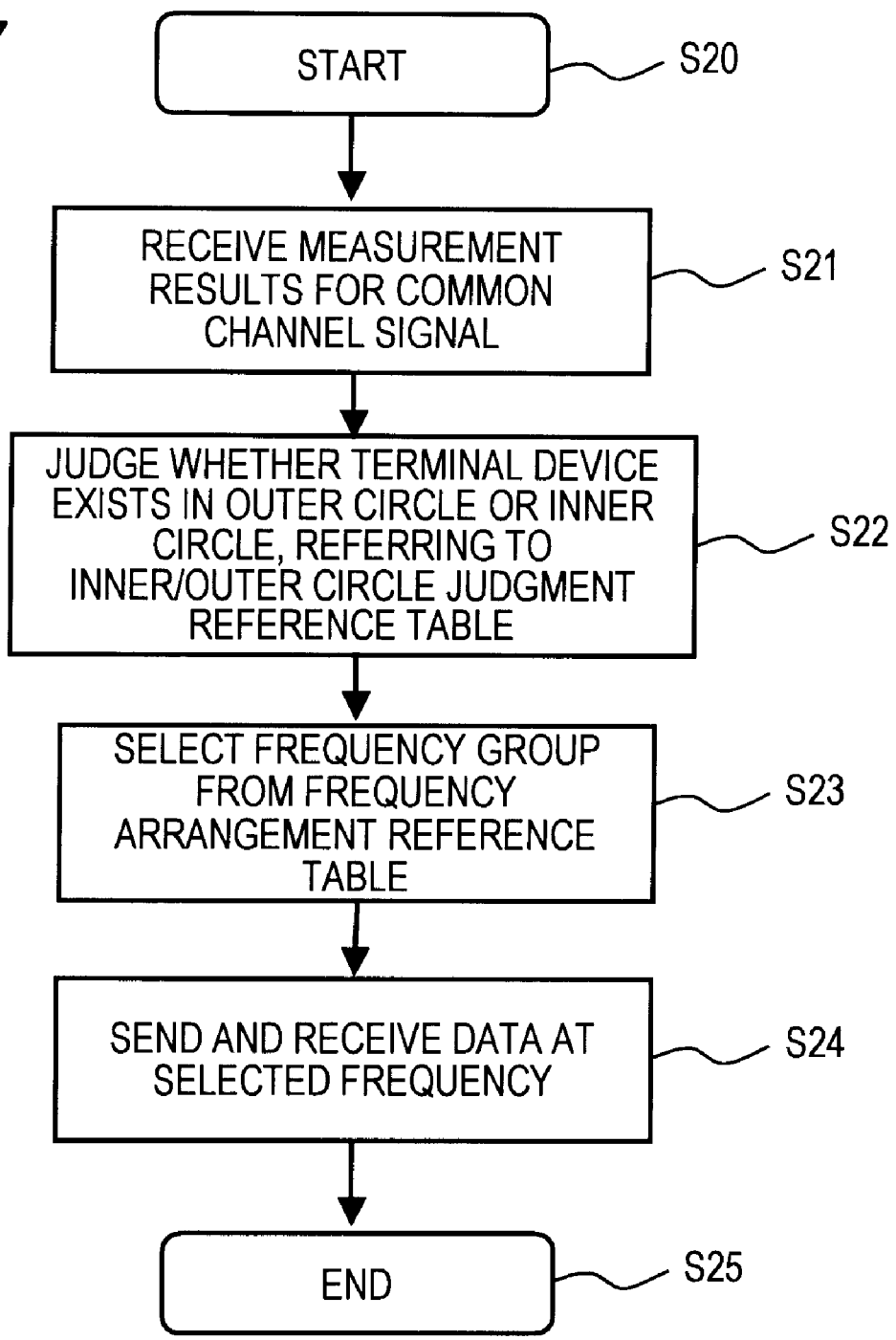
FIG. 7 is a flowchart depicting an example of operation of frequency allocation processing.
Figures 10, 11:
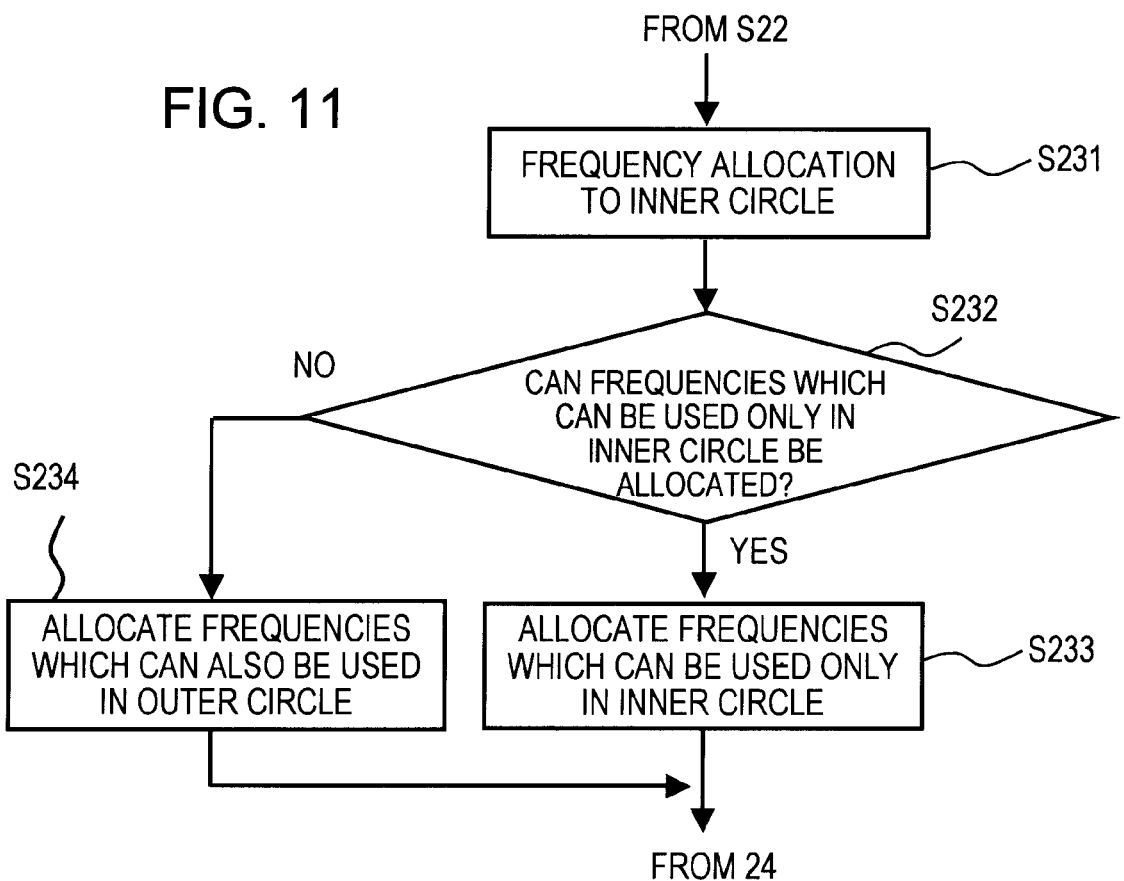
FIG. 10 depicts an example of a maximum transmission power reference table.
FIG. 11 is a flowchart depicting an example of operation of frequency allocation processing.

Next, operation is explained when allocating the frequencies depicted in FIG. 3 to the terminal apparatus. FIG. 7 is a flowchart of processing executed by the control unit 21 of the base station apparatus 20, and FIG. 8 to FIG. 10 are examples of tables used in the processing; FIG. 8 to FIG. 10 depict examples of the inner outer circle judgment reference table 251, frequency arrangement reference table 252, and maximum transmission power reference table 253, respectively. Each of the tables 251 to 253 is stored in the storage unit 26.

As depicted in FIG. 7, the control unit 21 starts the processing (S20), and receives measurement results for the common channel signal (S21). Measurement results can for example be obtained by transmitting the common channel signal from each of the antennas 23-1 to 23-6 under control of the control unit 21, upon which the terminal apparatus 10 measures the interference ratio SIR for the common channel signal and transmits the results to the base station apparatus 20. The control unit 21 receives measurement results for the communication quality between the terminal apparatus 10 and the base station apparatus 20.

Next, the control unit 21 judges whether the terminal apparatus 10 exists within the outer circle or within the inner circle, on the basis of referencing the inner outer circle judgment reference table 251 (S22). As depicted in FIG. 8, the control unit 21 judges the terminal apparatus 10 to be in the inner circle if the SIR measurement result is 10.9 (dB) or higher, and judges the terminal apparatus 10 to be in the outer circle if the SIR is lower than 10.9 (dB). Of course, this value of "10.9 dB" is one example, and another threshold value may be used.

Next, the control unit 21 selects the frequency group from the reference arrangement reference table 252 (S23). FIG. 9 is an example of the frequency arrangement reference table 252 for base station apparatus 20C. The frequency arrangement reference table 252 includes the number of sectors in which the terminal apparatus 10 is positioned, and the area (the inner circle or outer circle) in which the terminal apparatus 10 exists. The control unit 21 references the frequency arrangement reference table 252 using the information of the inner circle or outer circle obtained in S22 and the sector information received together with measurement results in S21.

Here, sector information is explained. First, common pilot signals are transmitted under control of the control unit 21 from the antennas 23-1 to 23-6 of the base station apparatus 20 corresponding to each sector. At this time, the SIR and similar for the common pilot signals are measured by the terminal apparatus 10 existing in the sectors, and the results are transmitted to the base station apparatus 20; these measurement results are received by one among the antennas 23-1 to 23-6 (or the sector RF units 22-1 to 22-6). The directions of the antennas 23-1 to 23-6 are fixed, and the corresponding sectors are also determined. Hence the information of the sector in which the terminal apparatus 10 is positioned can be obtained from which of the antennas 23-1 to 23-6 has received the measurement results. The sector information is output to the control unit 21 from for example the sector RF unit 22-1 to 22-6 which has received the measurement results.

The control unit 21 references the maximum transmission power reference table 253, and selects the transmission power value, too, when the control unit 21 selects the frequency group. The maximum transmission power reference table 253 depicted in FIG. 10 is an example for base station apparatus 20C. As depicted in FIG. 10, transmission power values are different for the inner and outer circles. Further, the base station maximum transmission power setting value is a power value of downlink-direction (the communication direction from the base station apparatus 20 to the terminal apparatus 10); the mobile station maximum transmission power setting value is a power value of the uplink direction (from the terminal apparatus 10 to the base station apparatus 20).

Returning to FIG. 7, the control unit 21 transmits and receives data using the selected frequency and transmission power value (S24). And, the series of processing ends (S25). Of course, the control unit 21 transmits and receives data using another frequency and transmission power value by referencing the table 251 to 253 on the basis of the measurement results, if the terminal apparatus 10 moves from the inner circle to the outer circle or from one sector to another sector.

Figure 14:
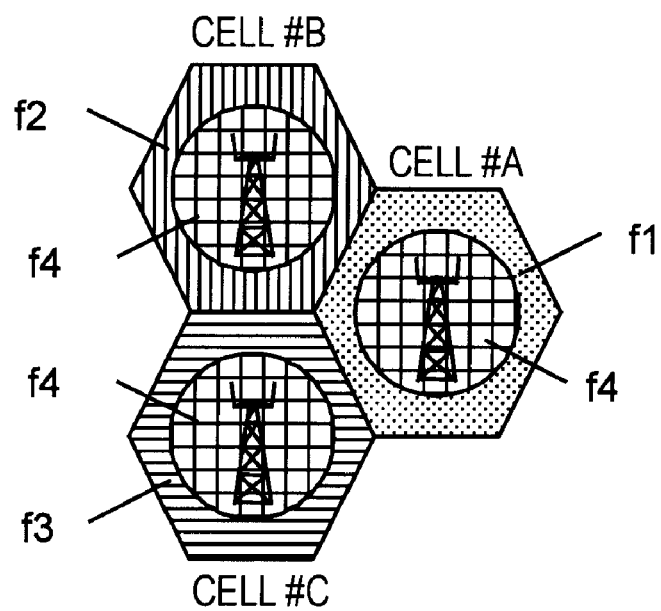
FIG. 14 depicts an example of frequency allocation of the prior art.
Figure 15A:
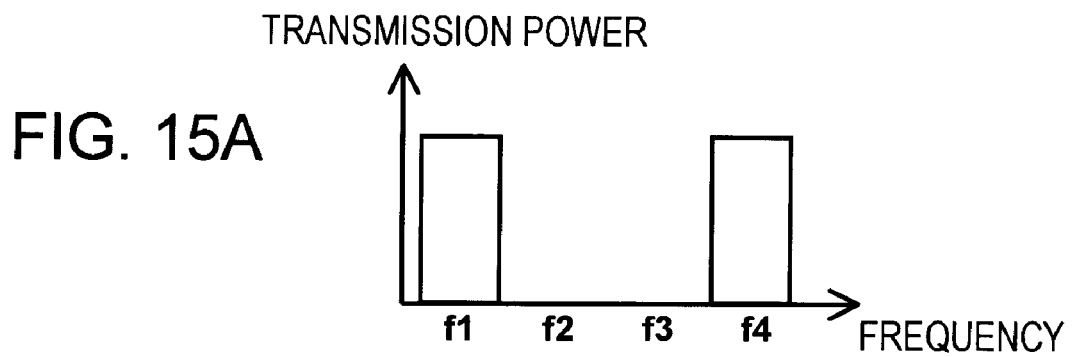
FIG. 15A to FIG. 15C depict examples of transmission power values.
Figure 15B:
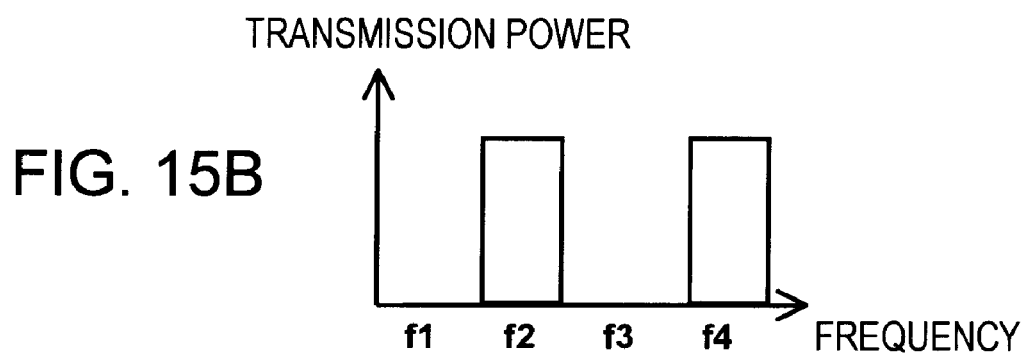
Figure 15C:
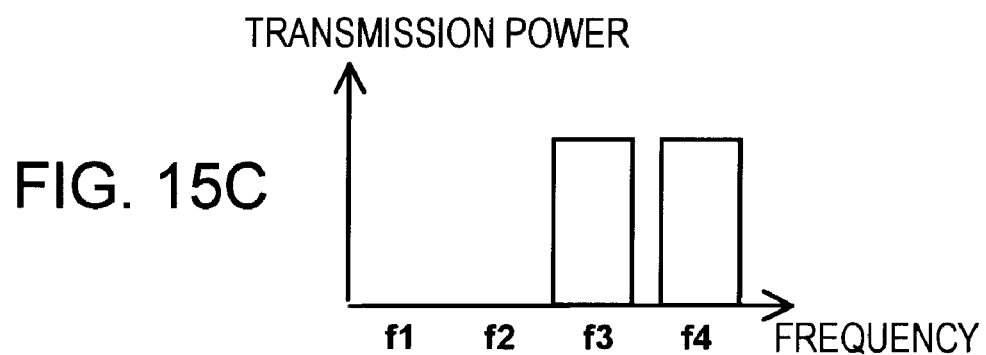
Figure 16:
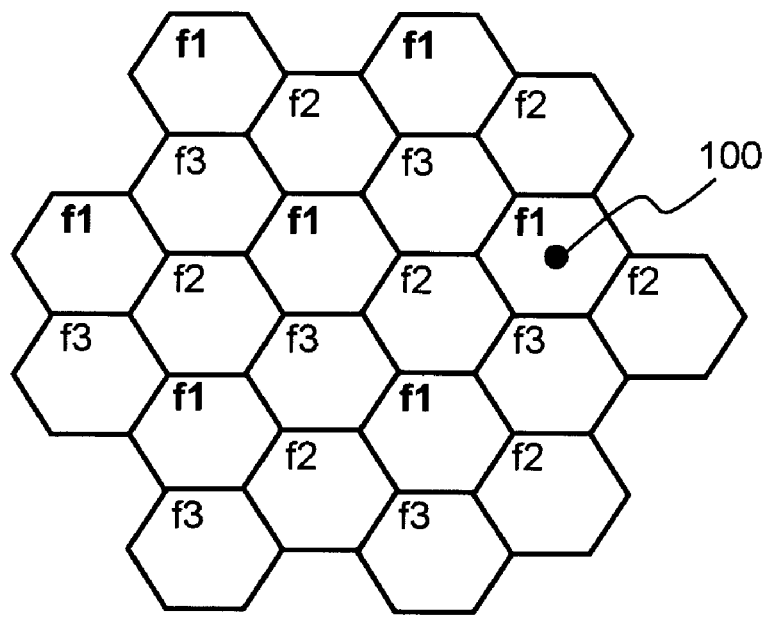
FIG. 16 depicts an example of frequency allocation in an omnicell system.
Figure 17:
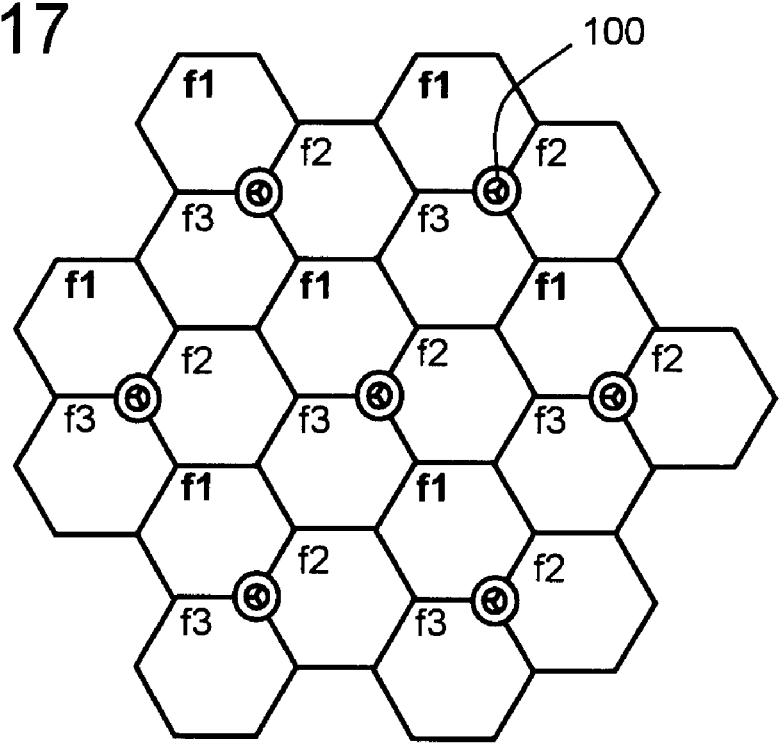
FIG. 17 depicts an example of frequency allocation in a sector cell system.
Figure 18:
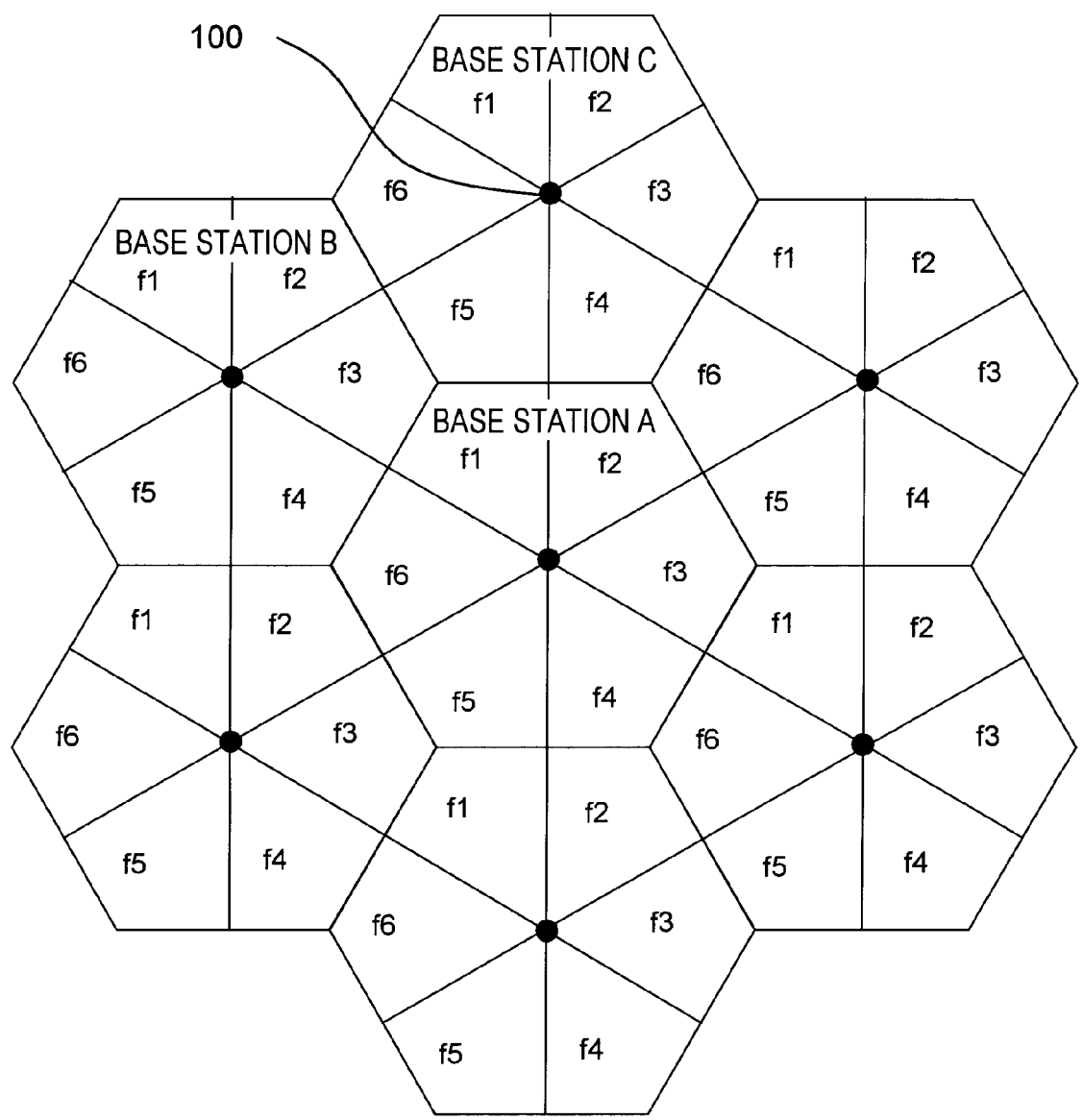
FIG. 18 depicts an example of frequency allocation in a sector cell system.

As depicted in FIG. 3, the frequency utilization efficiency in each sector for each of the base station apparatuses 20A to 20G is "3/6=1/2". Hence, the efficiency of the present embodiment is better than of the case of "six-sector cells" (FIG. 18). While the utilization efficiency of the case using the common frequency (FIG. 14) and the case of the present embodiment is "1/2" in both cases, the interference of the present embodiment is reduced, compared with the case of "omni cell" (FIG. 14), because each of the sectors and the cells of the present embodiment uses the "sector cell". Hence, in the present embodiment, the base station apparatus with high efficiency of frequency utilization can be provided. Moreover, in the present embodiment, the base station apparatus for which interference from adjacent cells and adjacent sectors is reduced can be provided.

Next, another embodiment is explained. In the above-described embodiment, the frequency allocated to the outer circle can also be used for communication in the inner circle in each sector. However, when the number of terminal apparatuses 10 is extremely big in the inner circle for example, it is a case that the frequency to allocate to the outer circle is exhausted if the frequency to allocate to the outer circle is too allocated to the inner circle. Hence, in one embodiment, such the situation is avoided by providing a limit on the frequencies that can be used in the inner circle.

Figure 12:
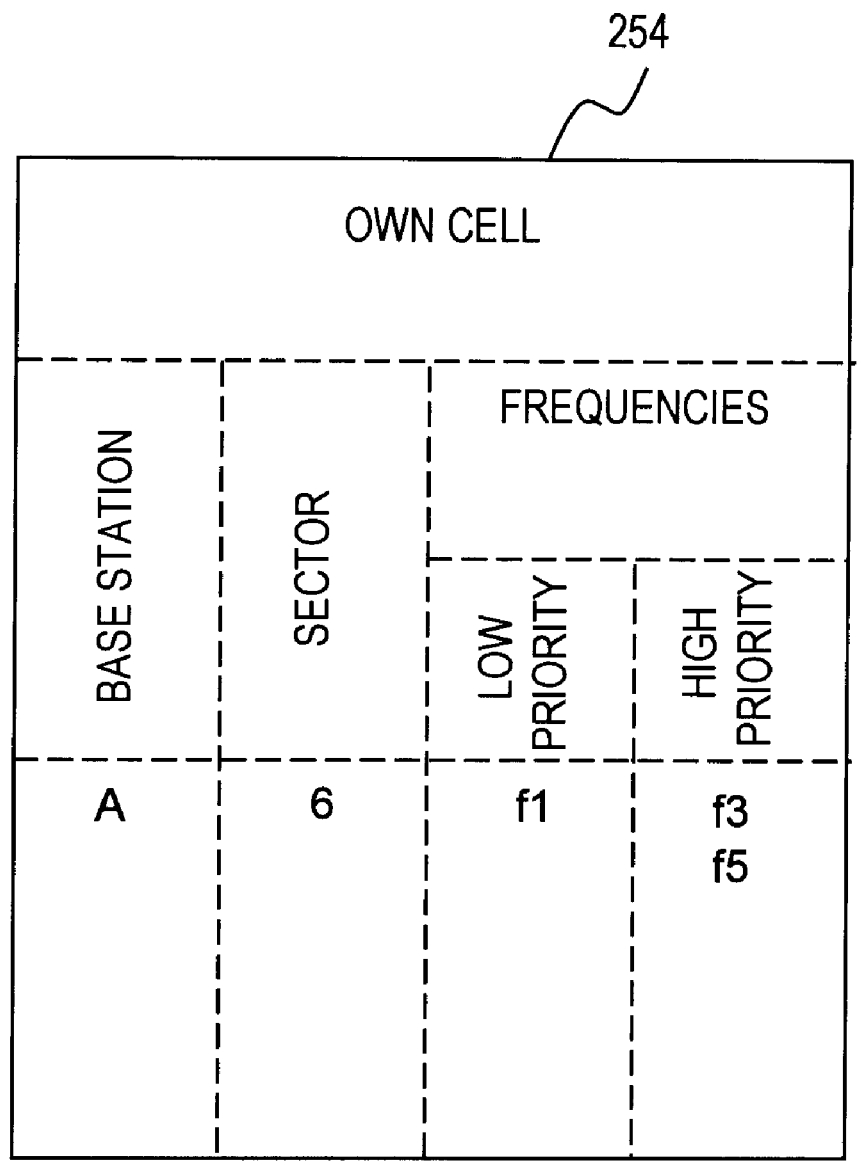
FIG. 12 depicts an example of a priority frequency selection reference table.
Figure 13:
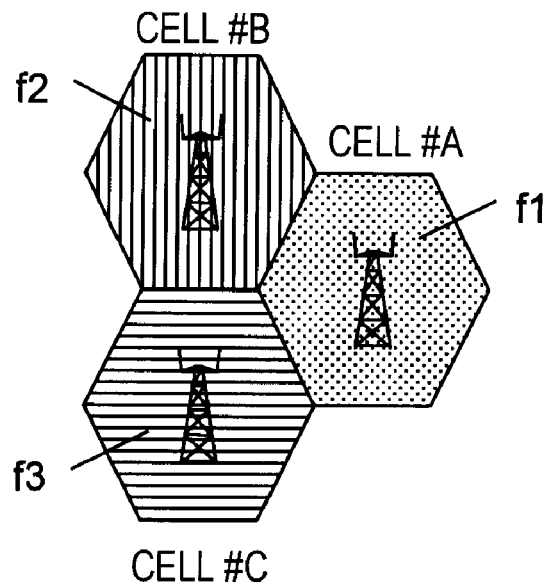
FIG. 13 depicts an example of frequency allocation of the prior art.

FIG. 11 depicts a flowchart of processing in the one embodiment, and FIG. 12 depicts an example of a priority frequency selection reference table 254. The priority frequency selection reference table 254 is stored in the storage unit 26.

Operation in the one embodiment is performed when the frequency group is selected by the control unit 21 from the frequency arrangement reference table 252 (S23 in FIG. 5). The control unit 21 allocates frequencies to the inner circle and outer circle according to the frequency arrangement reference table 252 (S231).

Next, the control unit 21 judges whether frequencies which can be used only in the inner circle can be allocated (S232). The control unit 21 references the priority frequency selection reference table 254 and makes the judgment. Specifically, the judgment is performed as follows.

That is, the control unit 21 references the priority frequency selection reference table 254, and determines whether the frequency allocated to the inner circle is a "low priority" or "high priority". When the frequency is the "high priority", the "frequency for use only in the inner circle" is allocated without modification (Yes in S232, S233).

The control unit 21 changes the allocation from the "low priority" frequency to the "high priority" frequency, if the frequency allocated to the inner circle is the "low frequency" and there is an unused "high priority" frequency (Yes in S232, S233). The "low priority" frequency is used without modification if there is no unused "high priority" frequency (No in S232, S234).

For example, when the frequency allocated to the inner circle is "f1", upon referencing the priority frequency selection reference table 254, this frequency is found to be "low priority", but the frequency "f3" or "f5" is allocated if there are unused resources which are "f3" and "f5" of the "high priority" frequency.

That is, in the one embodiment, the "frequency which can be used only in the inner circle" is allocated priority about the frequency allocated to the inner circle, and the "frequency which can also be used in the outer circle" is allocated if the number of the terminal apparatuses existing in the inner circle is greater than the threshold value and the "frequency which can be used only in the inner circle" cannot be allocated. By this processing, the problem in which too frequency which is to be allocated in the outer circle is used in the inner circle and are exhausted, can be resolved.

A frequency allocation method in a wireless base station device with high frequency allocation efficiency, and such a wireless base station device, can be provided. Moreover, a frequency allocation method which reduces interference from adjacent cells and adjacent sectors can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A frequency allocation method in a wireless base station apparatus communicating wirelessly with a terminal apparatus, the method comprising:

dividing a cell that is a communication range of the wireless base station apparatus into six sectors respectively with an outer circle and an inner circle, wherein the outer circle is a range of the cell, and the inner circle is a range at a shorter distance from the wireless base station apparatus than a distance of the outer circle;

allocating to a first terminal apparatus positioned in the outer circle of one sector, a frequency different from a frequency allocated to a second terminal apparatus positioned in an adjacent sector of the same cell, and different from a frequency allocated to a third terminal apparatus positioned in the outer circle of an adjacent sector of an adjacent cell;

allocating the frequency allocated to the first terminal apparatus to fourth and fifth terminal apparatus positioned in the inner circle of two sectors respectively arranged two sectors away from the sector in which the first terminal apparatus is positioned; and reducing a transmission power to the fourth and fifth terminal apparatus positioned in the inner circle by 5.6 dB from the transmission power to the first terminal apparatus positioned in the outer circle, and transmitting data to the first, or to the fourth and fifth terminal apparatus, wherein the inner circle is divided such that the ratio of the distance from the wireless base station apparatus to the inner circle, to the distance from a wireless base station apparatus of the adjacent cell to the inner circle, is 1.9, when the cell is divided into the outer circle and the inner circle.

2. A frequency allocation method in a wireless base station apparatus communicating wirelessly with a terminal apparatus, the method comprising:

dividing a cell that is a communication range of the wireless base station apparatus into six sectors respectively with an outer circle and an inner circle, wherein the outer circle is a range of the cell, and the inner circle is a range at a shorter distance from the wireless base station apparatus than the outer circle;

allocating to a first terminal apparatus positioned in the outer circle of one sector, a frequency different from a frequency allocated to a second terminal apparatus positioned in an adjacent sector of the same cell, and different from a frequency allocated to a third terminal apparatus positioned in the outer circle of an adjacent sector of the adjacent cell; and allocating the frequency allocated to the first terminal apparatus to fourth and fifth terminal apparatus positioned in the inner circle of two sectors respectively arranged two sectors away from the sector in which the first terminal apparatus is positioned, wherein the frequency allocated to the first terminal apparatus is allocated to the fourth and fifth terminal apparatus with precedence when the frequency is allocated to the fourth and fifth terminal apparatus, and a frequency to be allocated to a sixth terminal apparatus positioned in the outer circle of the same sector as the inner circle in which the fourth or fifth terminal apparatus is positioned is allocated to the fourth or fifth terminal apparatus when the number of the fourth or fifth terminal apparatuses exceeds a first threshold and the frequency to be allocated to the fourth and fifth terminal apparatus can not be allocated.

3. A frequency allocation method in a wireless base station apparatus communicating wirelessly with a terminal apparatus, the method comprising:

dividing a cell that is a communication range of the wireless base station apparatus into six sectors respectively with an outer circle and an inner circle, wherein the outer circle is a range of the cell, and the inner circle is a range at a shorter distance from the wireless base station apparatus than a distance of the outer circle;

receiving measurement result of communication quality with the wireless base station apparatus from the terminal apparatus, and determining position information indicating whether the terminal apparatus is positioned in the outer circle, or in the inner circle on the basis of the measurement result in a first table;

selecting the frequency to be allocated to the terminal apparatus on the basis of the position information in a second table, so that a first terminal apparatus positioned in the outer circle of one sector is allocated with a frequency different from a frequency allocated to a second terminal apparatus positioned in an adjacent sector of the same cell, and different from a frequency allocated to a third terminal apparatus positioned in the outer circle of an adjacent sector of an adjacent cell;

selecting a transmission power value for the terminal apparatus on the basis of the position information in a third table; and transmitting and receiving data with the terminal apparatus at the selected frequency and transmission power value, wherein the wireless base station apparatus reduces the power of transmission to the terminal apparatuses positioned in the inner circle by 5.6 dB from the power of transmission to the terminal apparatuses positioned in the outer circle, and transmits the data, when the wireless base station transmits data to the terminal apparatuses at the selected frequency and transmission power value, and wherein the inner circles are positioned in each of cells such that the ratio of the distance from the wireless base station apparatus to the inner circle, and the distance from a wireless base station apparatus of the adjacent cell to the inner circle, is 1.9.

4. A frequency allocation method in a wireless base station apparatus, the method comprising:

dividing a cell that is a communication range of the wireless base station apparatus into six sectors respectively with an outer circle and an inner circle, wherein the outer circle is a range of the cell, and the inner circle is a range at a shorter distance from the wireless base station apparatus than the outer circle;

receiving measurement result of communication quality with the wireless base station apparatus from the terminal apparatus, and determining position information indicating whether the terminal apparatus is positioned in the outer circle, or in the inner circle on the basis of the measurement result in a first table;

selecting the frequency to be allocated to the terminal apparatus on the basis of the position information in a second table, so that a first terminal apparatus positioned in the outer circle of one sector is allocated with a frequency different from a frequency allocated to a second terminal apparatus positioned in an adjacent sector of the same cell, and different from a frequency allocated to a third terminal apparatus positioned in the outer circle of an adjacent sector of the adjacent cell;

selecting a transmission power value for the terminal apparatus on the basis of the position information in a third table; and transmitting and receiving data with the terminal apparatus at the selected frequency and transmission power value, wherein the wireless base station apparatus reduces the power of transmission to the terminal apparatuses positioned in the inner circle by 5.6 dB from the power of transmission to the terminal apparatuses positioned in the outer circle, and transmits the data, when the wireless base station transmits data to the terminal apparatuses at the selected frequency and transmission power value, and wherein the frequency to be allocated to the terminal apparatus is allocated to the terminal apparatus positioned in the inner circle with precedence when the frequency allocated to the terminal apparatus is selected, and a frequency to be allocated to the outer circle in the same sector as the inner circle is selected when the number of the terminal apparatuses positioned in the inner circle exceeds a second threshold value and the frequency to be allocated to the terminal apparatus can not be allocated.

5. The frequency allocation method according to Claim 3, wherein the first table stores a third threshold value for the measurement results, and it is judged that the terminal is positioned in the outer circle if the measurement result is smaller than the third threshold value, and it is judged that the terminal is positioned in the inner circle if the measurement result is equal to or larger than the third threshold value, when the position information is determined.

6. The frequency allocation method according to Claim 3, wherein the second table stores sector number for identifying each of the sectors in the cell, the position information, and the frequency, and the sector number is acquired based on the received measurement result, and the frequency is selected on the basis of the acquired sector number and the position information in the second table, when the frequency to be allocated to the terminal apparatus is selected.

7. A wireless base station apparatus communicating wirelessly with a terminal apparatus, comprising:

a control unit configured to divide a cell that is a communication range of the wireless base station apparatus into six sectors respectively with an outer circle and an inner circle, wherein the outer circle is a range of the cell, and the inner circle is a range at a shorter distance from the wireless base station apparatus than distance of the outer circle;

a receiving unit configured to receive measurement result of communication quality with the wireless base station apparatus from the terminal apparatus, and determine position information indicating whether the terminal apparatus is positioned in the outer circle, or in the inner circle on the basis of the measurement result in a first table;

a selecting unit to select a frequency to be allocated to the terminal apparatus on the basis of the position information in a second table, so that a first terminal apparatus positioned in the outer circle of one sector is allocated with a frequency different from a frequency allocated to a second terminal apparatus positioned in an adjacent sector of the same cell, and different from a frequency allocated to a third terminal apparatus positioned in the outer circle of an adjacent sector of an adjacent cell, and to select a transmission power value for the terminal apparatus on the basis of the position information in a third table, wherein the control unit reduces the power of transmission to the terminal apparatuses positioned in the inner circle by 5.6 dB from the power of transmission to the terminal apparatuses positioned in the outer circle, and transmits data to the terminal apparatuses at the selected frequency and transmission power value, and wherein the inner circles are positioned in each of cells such that the ratio of the distance from the wireless base station apparatus to the inner circle, and the distance from a wireless base station apparatus of the adjacent cell to the inner circle, is 1.9.

* * * * *